United States Patent

[11] 3,583,208

| [72] | Inventors | Sydnor H. Byrne, Jr. <br> Newark; <br> Donald L. Casey, Wilmington, both of, Del. |
|---|---|---|
| [21] | Appl. No. | 736,733 |
| [22] | Filed | June 13, 1968 |
| [45] | Patented | June 8, 1971 |
| [73] | Assignee | E. I. du Pont de Nemours and Company <br> Wilmington, Del. |

[54] HIGH TEMPERATURE THERMOMECHANICAL ANALYZER
1 Claim, 4 Drawing Figs.

| [52] | U.S. Cl. | 73/16 |
|---|---|---|
| [51] | Int. Cl. | G01n 25/02 |
| [50] | Field of Search | 73/15, 16; 336/30; 323/51 |

[56] References Cited
UNITED STATES PATENTS

| 2,640,971 | 6/1953 | Macgeorge | 323/51 |
|---|---|---|---|
| 2,759,353 | 8/1956 | Roberts | 73/16 |
| 3,181,055 | 4/1965 | Bischof | 336/30 |
| 3,225,289 | 12/1965 | Koppel | 323/51 |
| 3,308,411 | 3/1967 | Roshala | 336/30 |
| 3,377,838 | 4/1968 | Kanazawa et al. | 73/16 |

OTHER REFERENCES

Dooley et al. " Electronic Vacuum Dilatometer" in The Review of Scientific Instruments Volume 26 #6 June 1955 pgs. 568—571

*Primary Examiner*—James J. Gill
*Assistant Examiner*—Herbert Goldstein
*Attorney*—Herbert M. Wolfson ABSTRACT: An insulated heater with close clearance, a temperature-compensated transducer, and an all quartz probe and sample holder provide baseline stabilization for a high temperature thermomechanical analyzer.

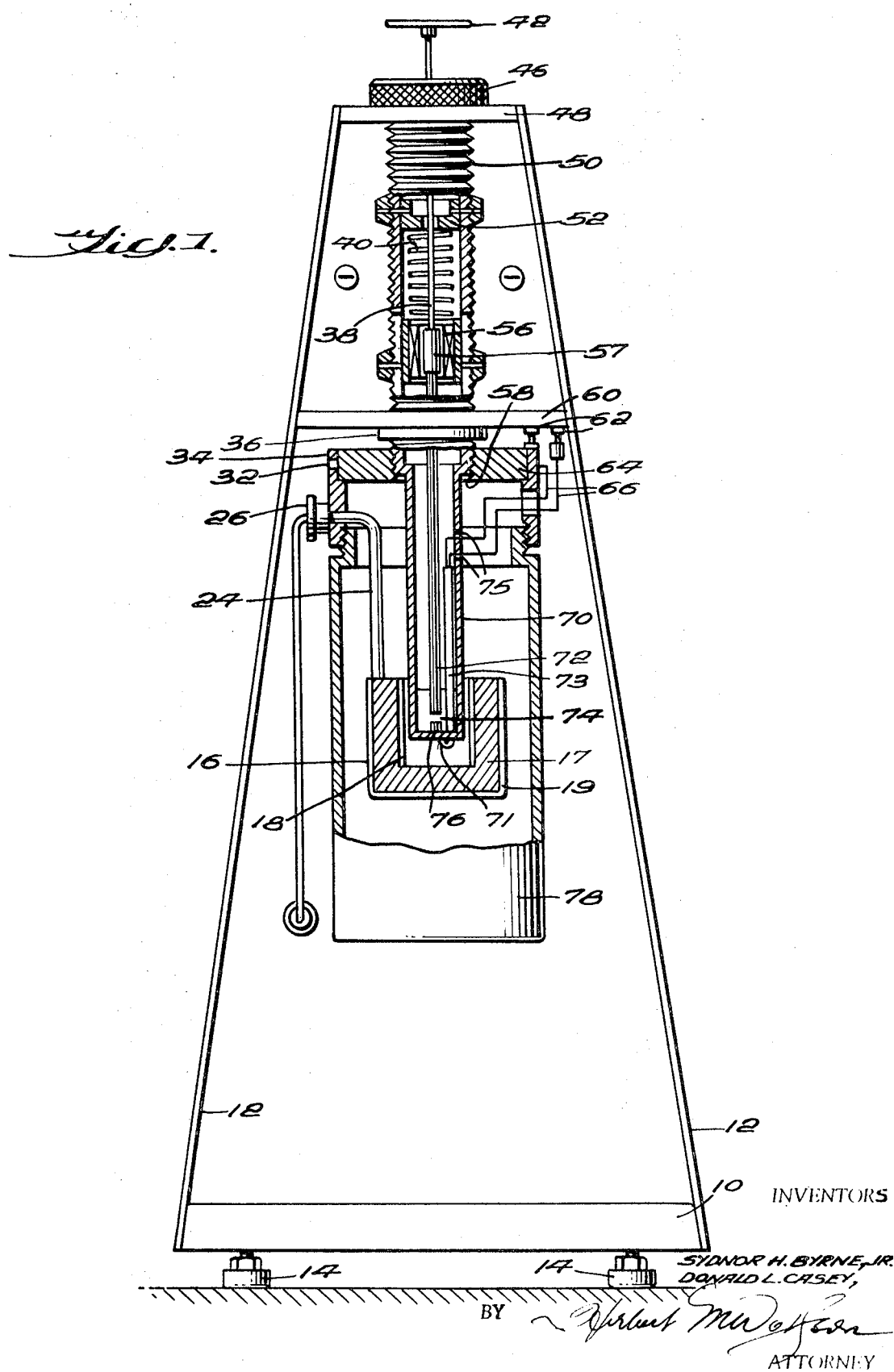

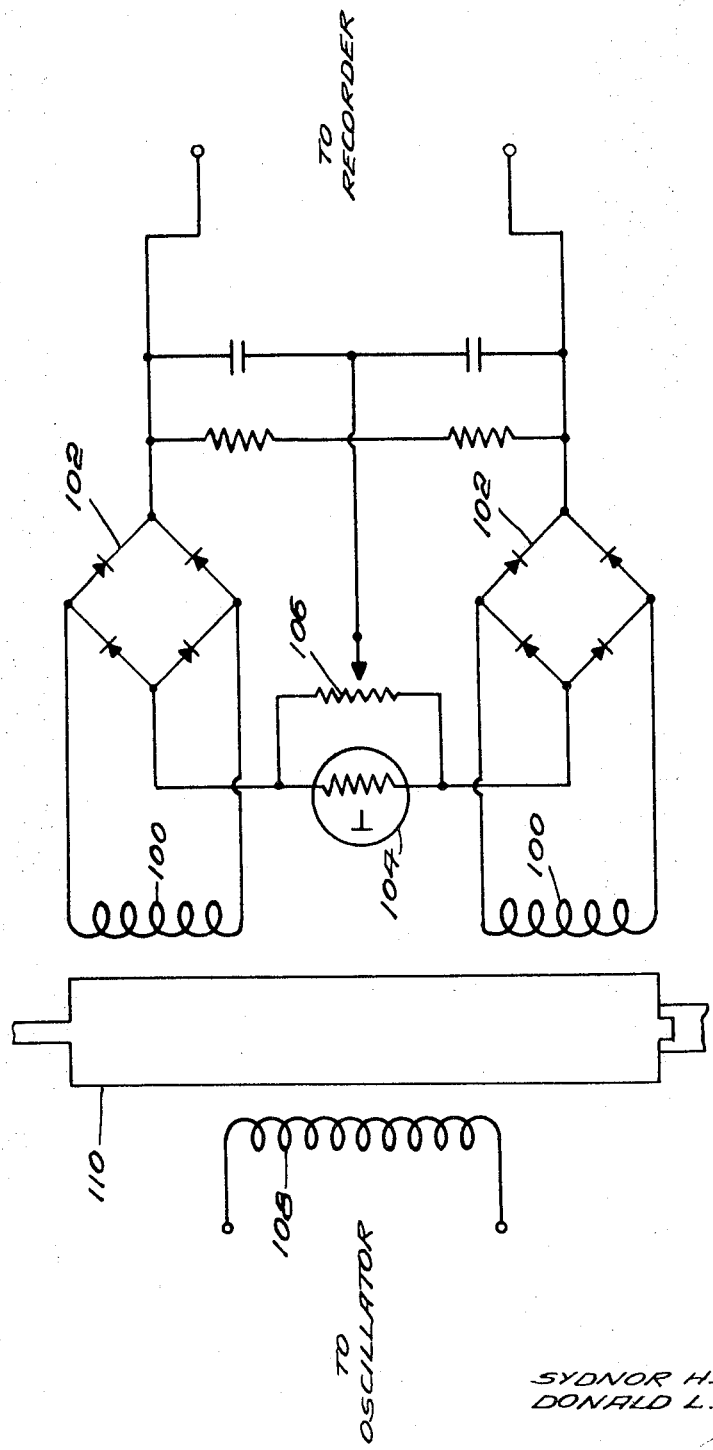

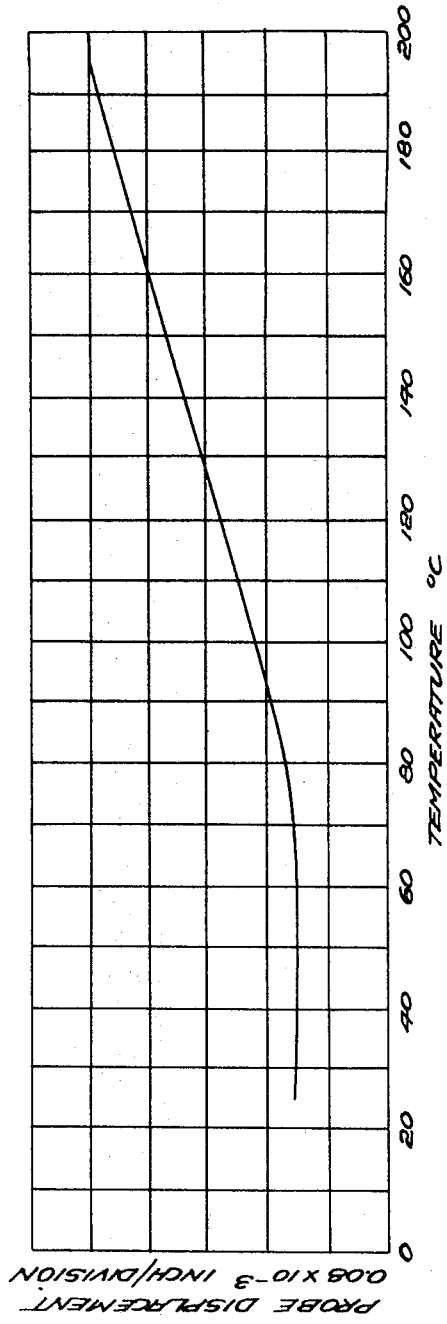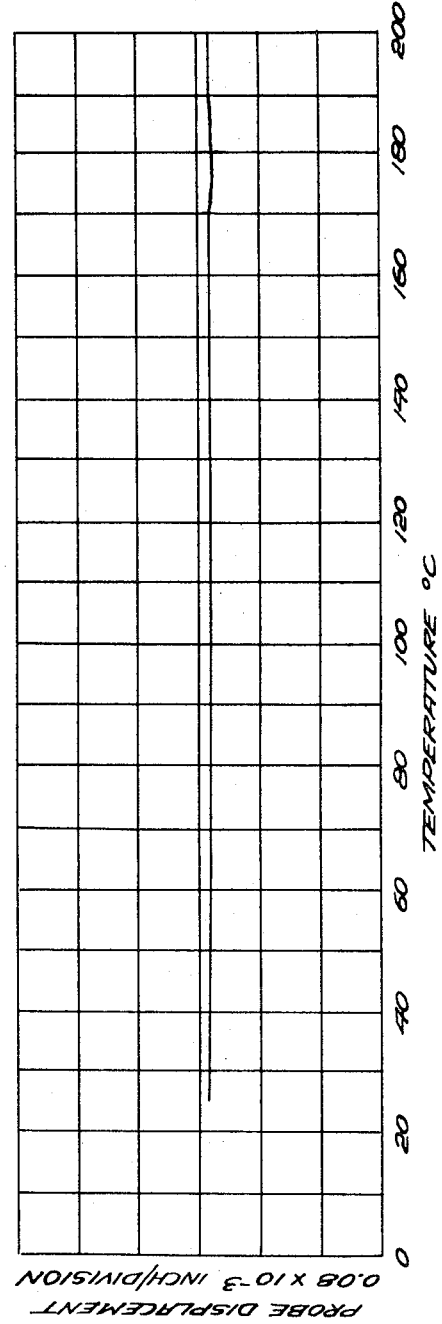

HIGH TEMPERATURE THERMOMECHANICAL ANALYZER

CROSS-REFERENCE

The subject invention is an improvement on a thermomechanical analyzer such as the one described in the copending application, Ser. No. 549,612, filed May 12, 1966, now U.S. Pat. No. 3,474,658 which description is incorporated herein by reference.

BACKGROUND OF THE INVENTION

1. Field of the Invention

This invention relates to an improvement in devices for determining the change in physical properties of a substance as a function of temperature. The class of these devices to which this invention is directed is that in which the position and/or rate of movement of a probe in contact with a sample material, is plotted against the temperature and/or rate of temperature change of the sample material.

More particularly, this invention relates to a solution of the problem of baseline stabilization in such devices when they are operated at high temperature.

2. Description of the Prior Art

In prior art devices, a shift in the "zero" reading, or baseline has accompanied high temperature operation. This shift is due to the escape of heat from the heater and sample to the surrounding electrical and mechanical components causing changes in their operating characteristics and, consequently, inaccuracy in readings.

Various unsatisfactory attempts have been made to stabilize the baseline of a high temperature thermomechanical analyzer. Shielding the heater from the rest of the instrument's components by means of a flat plate has proved inadequate. Placing the cooling jacket around the transducer has likewise proved inadequate, since the mechanical components are not cooled thereby, and their thermal expansion is one of the factors deleterious to high temperature operation.

Our improvement obviates such cumbersome and ineffective means of stabilizing the baseline of a thermomechanical analyzer to permit accurate readings at high temperatures.

SUMMARY OF THE INVENTION

The novel combination of the following elements has been found to provide adequate baseline stabilization in the high temperature thermomechanical analyzer, and, hence, increased accuracy of readings at high temperature:

1. an insulated heater remaining at all times out of contact with the sample holder, but having a core diameter no more than about 25 percent greater than the diameter of the exterior surface of the sample holder, and
2. means to compensate the transducer for temperature so as to yield a constant reading for a given probe position regardless of variation in the temperature of the transducer or other of the instrument's components.

BRIEF DESCRIPTION OF THE DRAWINGS

FIG. 1 is a partially schematic plan view of a thermomechanical analyzer in which the instant invention has been incorporated;

FIG. 2 is a schematic diagram of the preferred electrical circuitry for temperature-compensating the transducer;

FIG. 3 is a typical plot of a thermomechanical analyzer baseline;

FIG. 4 is a plot of a thermomechanical analyzer baseline in which the improvement of the instant invention has been incorporated.

DESCRIPTION OF THE PREFERRED EMBODIMENT

To more fully understand the invention, refer to its embodiment in a thermomechanical analyzer as shown in FIG. 1. The thermomechanical analyzer comprises a base 10 having attached thereto rising support members 12. Affixed to the upper portion of the rising support members 12 are an upper horizontal support 48 and a lower horizontal support 60. The horizontal support members 48 and 60 have openings therein to receive an externally threaded, vertically positioned, tubular head assembly 50. The head assembly 50 is held securely in position by an upper retainer nut 46 screwably fastened against the top of the upper horizontal support 48 and a lower retainer nut 36 screwably fastened against the bottom of the lower horizontal support 60. Any suitable material, for example, aluminum, can be used for construction of the supporting structure of the analyzer.

Three adjustable leveling legs 14 mounted to the base 10 give the entire analyzer horizontal stability.

A shaft 38 constructed of any suitable nonmagnetic material, for example, a nonmagnetic stainless steel, is slideably positioned within the head assembly 50 and is suspended therein by an adjustable suspension mechanism comprising small helical spring 40, connected to the shaft 38 and to a vertically adjustable position control, generally designated as 52. Affixed to the top of the shaft 38 is a weight tray 42, upon which weights can be placed to axially load the shaft 38.

Housed within the lower portion of the head assembly is an adjustable transducer, generally designated as 56, which translates vertical motion of the shaft 38 into an electrical output signal. The adjustable transducer 56 is a linear variable differential transformer. The strength of the signal induced in the secondary windings of the AC input to the primary windings is a function of the position of the movable transformer core 57. The secondary windings are connected to an adjustable temperature compensating circuit which makes the transducer output relatively insensitive to temperature changes of the transducer 56 and other components, occurring, usually due to loss of heat from the heater 16.

An insulated flask assembly has three parts, an insulated flask, 78, and a two-piece cap. The inner ring 64 of the cap is screwably attached to the lower portion of the head assembly. The outer ring 34 is slideably fitted to the inner ring 64 and is secured thereto by a setscrew 32. The insulated flask 78 is inturn screwably attached to the outer ring 34 of the cap. The flask assembly is of the Dewar type, and is constructed of materials to withstand the operating temperatures of the analyzer, that is, from $-250°$ C. to $1,000°$ C.

A sample holder 70 is made of material with a low coefficient of thermal expansion, preferably quartz. The upper lip of the sample holder is positioned in a circular recess in the top of the inner flask cap ring 64. A resilient washer 58 is placed between the upper lip of the sample holder 70 and the inner ring 64 to prevent damage to the sample holder 70 when the assembly is screwably fitted to the bottom portion of the head assembly 50. Thus, when the inner ring 64 is fastened to the head 50, the sample holder is intimately contacted with the head 50 and held firmly in that position by the resilient washer 58 and the inner cap ring 64.

A sample temperature measuring thermocouple 71 is located in the base of the sample holder to assure the temperature of the sample as it is tested. The thermocouple leads 66 are enclosed in a quartz tube 73 having two interior channels. The quartz tube 73 is bonded to the inner wall of the sample holder. The thermocouple leads 66 exit the sample holder through two holes 75 in the sample holder and are attached to connectors 62 on the lower horizontal support member 60. Placement of the sample temperature measuring thermocouple 71 in the sample holder obviates the disadvantageous placement of a thermocouple in the probe.

A cylindrical probe 72 is concentrically positioned below the shaft 38 and is bonded securely thereto with epoxy cement. The lower end of the probe 72 is located directly above the ample 76 on which it rests during operation. The sample 76 is inserted through an aperture 74 in the sample holder 70. The probe 72 is constructed of the same material as the sample holder 70, preferably quartz. The use of an all quartz probe secured to the shaft by bonding minimizes inaccuracy in the readings due to thermal expansion of the probe itself, and of metallic attachments which would be needed if the probe were secured otherwise than by bonding. In addition, bonding of the probe 72 to the shaft 38 makes the probe and shaft easily removable.

A cylindrical heater 16 with a self-contained control thermocouple is fitted around the lower portion of the sample holder tube 70. The heater contains windings of resistance wire around a ceramic core. The windings are cemented into place. After the cement has been allowed to dry, the exterior surface of the wound ceramic core 18 is encased with a liquid-tight cover 19, the space between said cover and said core being filled with an insulating material 17. The heater thus constructed does not radiate an excessive amount of heat to its surroundings. It is also desirable from the standpoint of preventing heat loss to provide as close a clearance between the sample holder and the heater core as possible without letting them contact each other. Contact therebetween causes inaccuracy in the readings. We have found that a heater core having an interior diameter no more than 25 percent greater than the exterior diameter of the sample holder is most desirable for preventing heat loss. The close clearance also reduces the time lag in temperature programming the heater.

The heater is held in position by tightening a nut 26 on the heater support arm 24 which locks it in position in a spot provided in the outer ring 34 of the insulated glass cap.

The temperature-compensating means (not shown in FIG. 1) preferably includes a heat-variable resistor, known as a "thermistor" which is located in close proximity to the transducers 56 and the shaft 38. In one type of high temperature thermomechanical analyzer, two separate secondary windings 100 of the transducer are connected to two diode bridges 102 which, in the preferred embodiment, are also located in close proximity to the transducer for full-wave signal rectification, as shown in FIG. 2. The two diode bridges 102 are connected by a thermistor 104, said thermistor being in parallel connection with a resistor 106 containing a variable tap, said tap being connected to the output leads of the transducer, as shown. The thermistor 104 in parallel with the resistor 106 provides an imbalance between the two diode bridges 102. The amount of this imbalance provided by the thermistor varies with temperature, and the magnitude of this temperature variance is determined by the variable tap on the resistor 106. This imbalance between the bridges is thereby set equal and opposite to the imbalance between the bridges caused by heating effects. The latter imbalance derives from three sources: (1) the change in the shaft 38 length upon heating which introduces the largest imbalance; (2) heating effects on the diode bridge circuits, which is a significant source of error, and (3) the change in resistance in the secondary winding 100 of the transducer 56, which is minor. As a result of the improved heater 16, the temperature range experienced in the vicinity of the transducer is small, about 5° C.—10° C. As a result, the above three sources of error as well as the thermistor all operate linearly over this entire range. To adjust the compensating device, the thermomechanical analyzer is operated without a sample at a first temperature and a reading taken. The analyzer is operated at a second temperature and the variable tap on the resistor 106 adjusted until the reading at the second temperature is that obtained at the first temperature. By this procedure, temperature compensation is provided for the entire operating range of the thermomechanical analyzer. The variable tap makes the temperature compensating means adjustable; hence, the baseline may be altered as desired, by a simple adjustment of the resistor 106. This circuitry compensates for the effect of temperature on the signal transmitted to the probe-position recorder, which is induced in the secondary windings 100 of the transducer by the AC input of the oscillator to the primary winding 108 of the transducer. The signal transmitted to the recorder is therefore dependent only on the position of the movable core 110 of the transducer and not on the temperature of the transducer or other of the instrument's components external to the heater.

FIG. 3 is a plot of indicated probe displacement versus temperature, when there is no sample in the instrument. The temperature is that indicated by the sample temperature measuring thermocouple located in the sample holder. The end of the probe was at all times resting on the base of the sample holder while the baseline plot in FIG. 3 was made. Since there was no actual probe displacement, it is desirable that the baseline be flat instead of sloping as shown.

FIG. 4 is a plot of indicated probe displacement versus temperature, made under the same conditions as the FIG. 3 baseline plot except that it was made with a thermomechanical analyzer as improved by the instant invention. The relatively flat baseline plot of FIG. 4 indicates the baseline of a thermomechanical analyzer and, hence, providing increased accuracy of readings at high temperature. The baseline of the improved thermomechanical analyzer has exhibited a stability of $\pm 0.064 \times 10^{13}$ inches of indicated probe displacement over a range of $-120°$ C. to $1,000°$ C., with virtually no fluctuations over the range of $100°$ C. to $500°$ C. Such stability permits accurate readings over the entire range of test temperature for most materials, without the need for correction of readings due to variations in the baseline of the instrument.

We claim:
1. In a thermomechanical analyzer having
a supporting frame,
a head assembly mounted on said frame,
axially aligned guides mounted in said head assembly,
a shaft slideably positioned in said guides,
a transducer, responsive to the displacement of said shaft, comprising at least three wire coils coupled by a movable core attached to said shaft,
a sample holder positioned in concentric relation to said shaft, having a sample receiving end,
a probe attached to the end of said shaft, said probe extending into said sample holder,
means for providing indication of the sample temperature,
a heater having a hollow cylindrical core, said heater core being positioned in concentric relation to said sample holder, the inner surface of said core being out of contact with said sample holder,
an external jacket for said heater, and insulating material located between the interior of said jacket and the exterior surface of said core,
the improvement comprising
means for temperature-compensating the output of said transducer, said temperature-compensating means capable of operating with said transducer and comprising a thermistor connected to the electrical circuit of said transducer, said thermistor disposed in proximity to said transducer, and said circuit of said means for temperature-compensating said transducer comprising a pair of diode bridges coupled by said thermistor, said thermistor being in parallel connection with a resistor having a variable tap coupled to the output terminal of said bridges, one of said wire coils being coupled across each of said bridges, whereby changes in the transducer output due to changes in the temperature of the surroundings of said heater are compensated.